(12) United States Patent
Kornbluth et al.

(10) Patent No.: US 11,884,561 B2
(45) Date of Patent: Jan. 30, 2024

(54) CONVERSION MATERIALS FOR ELECTROCHEMICAL REMOVAL OF CHLORIDE-CONTAINING SALTS FROM WATER

(71) Applicant: Robert Bosch GmbH, Stuttgart (DE)

(72) Inventors: Mordechai C. Kornbluth, Brighton, MA (US); Jonathan Mailoa, Cambridge, MA (US); Soo Kim, Cambridge, MA (US); Georgy Samsonidze, San Francisco, CA (US); Boris Kozinsky, Waban, MA (US); Saravanan Kuppan, Sunnyvale, CA (US); Sondra Hellstrom, East Palo Alto, CA (US); Nathan Craig, Burlingame, CA (US)

(73) Assignee: Robert Bosch GmbH, Stuttgart (DE)

( * ) Notice: Subject to any disclaimer, the term of this patent is extended or adjusted under 35 U.S.C. 154(b) by 1109 days.

(21) Appl. No.: 16/595,674

(22) Filed: Oct. 8, 2019

(65) Prior Publication Data
US 2020/0123029 A1 Apr. 23, 2020

Related U.S. Application Data

(60) Provisional application No. 62/749,091, filed on Oct. 22, 2018.

(51) Int. Cl.
*C25B 11/00* (2021.01)
*C02F 1/461* (2023.01)
(Continued)

(52) U.S. Cl.
CPC .................. *C02F 1/46109* (2013.01); *C02F 2001/46133* (2013.01); *C02F 2101/12* (2013.01); *C02F 2103/08* (2013.01)

(58) Field of Classification Search
CPC ........ C02F 2001/46133; C02F 2101/12; C02F 2103/08; C02F 1/46109; C25B 11/00
See application file for complete search history.

(56) References Cited

U.S. PATENT DOCUMENTS 6,248,478 B1 6/2001 Friend et al.
7,425,285 B2 9/2008 Asao et al.
(Continued)

FOREIGN PATENT DOCUMENTS

CN 101291880 A 10/2008
CN 101481159 A 7/2009
(Continued)

OTHER PUBLICATIONS

The Materials Project, available at www.materialsproject.org, accessed at least as early as Oct. 21, 2018.
(Continued)

*Primary Examiner* — Zulmariam Mendez
(74) *Attorney, Agent, or Firm* — Maginot, Moore & Beck LLP

(57) ABSTRACT

A device for removing chloride-containing salts from water includes a container configured to contain saline water, a first electrode arranged in fluid communication with the saline water, and a power source. The first electrode includes a conversion material that is substantially insoluble in the saline water and has a composition that includes at least two or more of aluminum, chlorine, copper, iron, oxygen, and potassium. The composition varies over a range with respect to a quantity of chloride ions per formula unit. The power source supplies current to the first electrode in a first operating state so as to induce a reversible conversion reaction in which the conversion material bonds to the chloride ions in the saline water to generate a treated water solution. The conversion material dissociates the chloride
(Continued)

ions therefrom into the saline water solution in a second operating state to generate a wastewater solution.

20 Claims, 2 Drawing Sheets

(51) Int. Cl.
*C02F 101/12* (2006.01)
*C02F 103/08* (2006.01)

(56) References Cited

U.S. PATENT DOCUMENTS

| | | | |
|---|---|---|---|
| 7,974,076 | B2 | 7/2011 | Xiong et al. |
| 8,721,743 | B2 | 5/2014 | Andrews et al. |
| 9,039,788 | B2 | 5/2015 | Xu et al. |
| 9,340,436 | B2 | 5/2016 | Sahu et al. |
| 9,406,933 | B2 | 8/2016 | Jeong et al. |
| 9,673,472 | B2 | 6/2017 | Volkel et al. |
| 2008/0198531 | A1 | 8/2008 | Shiue et al. |
| 2014/0134478 | A1 | 5/2014 | Zhao et al. |
| 2014/0159668 | A1 | 6/2014 | Whitacre et al. |
| 2015/0021185 | A1 | 1/2015 | Park et al. |
| 2015/0274555 | A1 | 10/2015 | Volkel et al. |
| 2016/0248082 | A1 | 8/2016 | Yersak et al. |

FOREIGN PATENT DOCUMENTS

| | | |
|---|---|---|
| CN | 103193299 A | 7/2013 |
| CN | 104108771 A | 10/2014 |
| CN | 105324875 A | 2/2016 |
| WO | 2018/132072 A1 | 7/2018 |

OTHER PUBLICATIONS

Chen, F. et al., "A dual-ion electrochemistry deionization system based on AgCl—Na0.44MnO2 electrodes," Nanoscale, 2017, 9, pp. 10101-10108 (8 pages).

Chen, F. et al., "Dual-ions electrochemical deionization: a desalination generator," Energy & Environmental Science, 2017, 10, pp. 2081-2089 (9 pages).

Amit, M. et al., "Preparation and Crystal Structure of KFeCl3 and KFeBr3," Israel Journal of Chemistry, 12 (4), 1974, pp. 827-830 (4 pages).

CONVERSION MATERIALS FOR ELECTROCHEMICAL REMOVAL OF CHLORIDE-CONTAINING SALTS FROM WATER

This application claims the benefit of U.S. Provisional Application 62/749,091, filed Oct. 22, 2018, the disclosure of which is incorporated herein by reference in its entirety.

FIELD

The disclosure relates to treatment of water and more particularly to electrode conversion materials for electrochemical removal of chloride-containing salts from water.

BACKGROUND

The demand for fresh, potable water is substantial and increasing due to population grown. This growing demand creates a substantial market for desalination and other purification activities especially since the vast majority of the Earth's available water is "saline water" (approximately 97.5%), which typically has salt concentrations that are too high for human consumption. Saline water includes ocean water as well as "brackish water." which contains more salt than fresh water but less salt than ocean water. Much of the remaining available "fresh water" is locked up in ice (glaciers and ice caps) and in the ground. The scarcity of fresh water resources and the need for additional water supplies is already critical in many arid regions of the world and will be increasingly important in the future.

There are a variety of existing techniques for removing ions from water, each with advantages and disadvantages that make the different technologies more or less desirable for a given application. Reverse osmosis (RO) and modern thermal distillation are techniques that are effective at comprehensive, non-selective removal of ions from water (i.e., deionization). Since these techniques remove water from salts, they are most advantageous when the initial ion load is quite high such as in the case of ocean water desalination. However, RO and thermal distillation techniques suffer from generally high cost due to the significant energy inputs required so these techniques are typically not recommended for purification of brackish water sources with lower ion loads.

Another technique for removing ions from water includes electrochemical technologies such as electrodialysis or electroabsorption. These techniques typically remove ions from feed water using ion-exchange membranes and/or high-surface-area carbon in connection with an applied potential to attract ions out of the water to an electrode and to limit desorption. Capacitive deionization (CDI) has been suggested as a useful electrochemical process for purifying water from brackish water sources since purification of brackish water typically only requires partial removal of ions from the water stream.

A CDI device typically includes a cathode and an anode. During a purification cycle, cations are added to the cathode and anions are added to the anode. The next cycle applies a voltage to flush the ions out of the electrodes, expelling an impurity-heavy wastewater. The electrodes are then available for the next purification cycle. One challenge to expanding CDI for use in desalination of brackish water sources is to identify appropriate anode materials that can take chloride ions ($Cl^-$) and/or other anions from the water in the purification cycle, and then reversibly discharge it in a regeneration cycle.

Desalinated water as well as fresh water from traditionally safe sources such as municipal water sources or potable water from wells may nonetheless possess qualities that are less desirable to the water consumer. For instance, such water can vary significantly with respect to taste, odor, turbidity, bacterial and/or viral contamination, heavy metal contamination, hardness, mineral deposits, and/or a combination of these water quality parameters. The quality parameter of water hardness relates to the concentration of calcium ions ($Ca^{2+}$) and/or magnesium ions ($Mg^{2+}$) present in a given volume of water. Calcium and/or magnesium exist in water in the form of salts, which are normally soluble in the form of sulfates, carbonates, bicarbonates, or chlorides. The soluble salts are often ionized so that the water contains a relatively high concentration of calcium ions and/or magnesium ions.

Water is typically classified according to hardness as "soft water" or "hard water." The harder the water, the greater the concentration of calcium and/or magnesium ions per volume. Hard water is typically undesirable because it can cause scale buildup in plumbing, fixtures, and appliances and may affect the performance these systems and devices. For instance, the heat from a hot water heater removes some calcium carbonate and magnesium carbonate from the water, resulting in scale buildup that can slow the heating process and increase energy usage. Cleaning agents used with hard water are often less effective. Clothes washed in hard water may become dingy and gray with time and feel harsh or scratchy. Glassware may become spotted as it dries. Films may be left on shower doors or curtains, walls, and tubs, and hair washed in hard water may look dull and not feel clean. Hard water is especially problematic in manufacturing or industrial contexts. The process of removing calcium ions and/or magnesium ions from hard water is commonly referred to as water softening.

The most common technology for water softening is ion exchange. In an ion exchange softening system, the softening device when active uses an ion exchange resin to replace calcium ions and/or magnesium ions in a feed water stream with sodium ions. The ion exchange resins or zeolites contain weakly-bound sodium atoms that can exchange with calcium to "soften" the water by undergoing the reaction $XNa_2 + Ca^{2+} \rightarrow XCa + 2Na^+$. Water softened via ion exchange does have some disadvantages. For instance, ion exchange resins must be periodically recharged by processing them in a high-sodium solution, such as sodium hydroxide or extremely salty water. This requires action by the user to routinely add salt to the system to maintain system efficiency, which can be a burden to the user.

What is needed, therefore, are electrode materials configured to reversibly store and release chlorine via a reversible conversion reaction for use in a water treatment process. A water treatment device that includes the electrode materials to remove chloride-containing salts from water would be further advantageous.

SUMMARY

A device for removing chloride-containing salts from water in one embodiment includes a container, a first electrode, and a power source. The container is configured to contain a saline water solution that has a first concentration $c_1$ of chloride ions. The first electrode is arranged in fluid communication with the saline water solution and includes a conversion material that is substantially insoluble in the saline water solution. The conversion material has a composition that includes at least two or more of aluminum, chlorine, copper, iron, oxygen, and potassium. The composition of the conversion material is variable over a range with respect to a quantity of chloride ions per formula unit. The power source is configured to supply current to the first electrode so as to induce a reversible conversion reaction. In a first operating state, the conversion material associates with the chloride ions in the saline water solution to generate a treated water solution that has a second concentration $c_2$ of the chloride ions. In a second operating state, the conversion material dissociates the chloride ions therefrom into the saline water solution to generate a wastewater solution that has a third concentration $c_3$ of the chloride ions. The third concentration $c_3$ is greater than the first concentration $c_1$, which in turn is greater than the second concentration $c_2$.

A conversion electrode for a device in one embodiment includes a conversion material that has a composition that includes at least two or more of aluminum, chlorine, copper, iron, oxygen, and potassium. The composition is variable over a range with respect to a quantity of chloride ions per formula unit. The conversion material is configured to be at least partially immersed and substantially insoluble in a saline water solution and undergo a reversible conversion reaction. In a first condition of the conversion electrode, the conversion material associates with chloride ions in the saline water solution, thereby increasing the quantity of chloride ions per formula unit. In a second condition of the conversion electrode, the conversion material dissociates the chloride ions therefrom into the saline water solution, thereby decreasing the quantity of chloride ions per formula unit.

DETAILED DESCRIPTION

Figure 1:
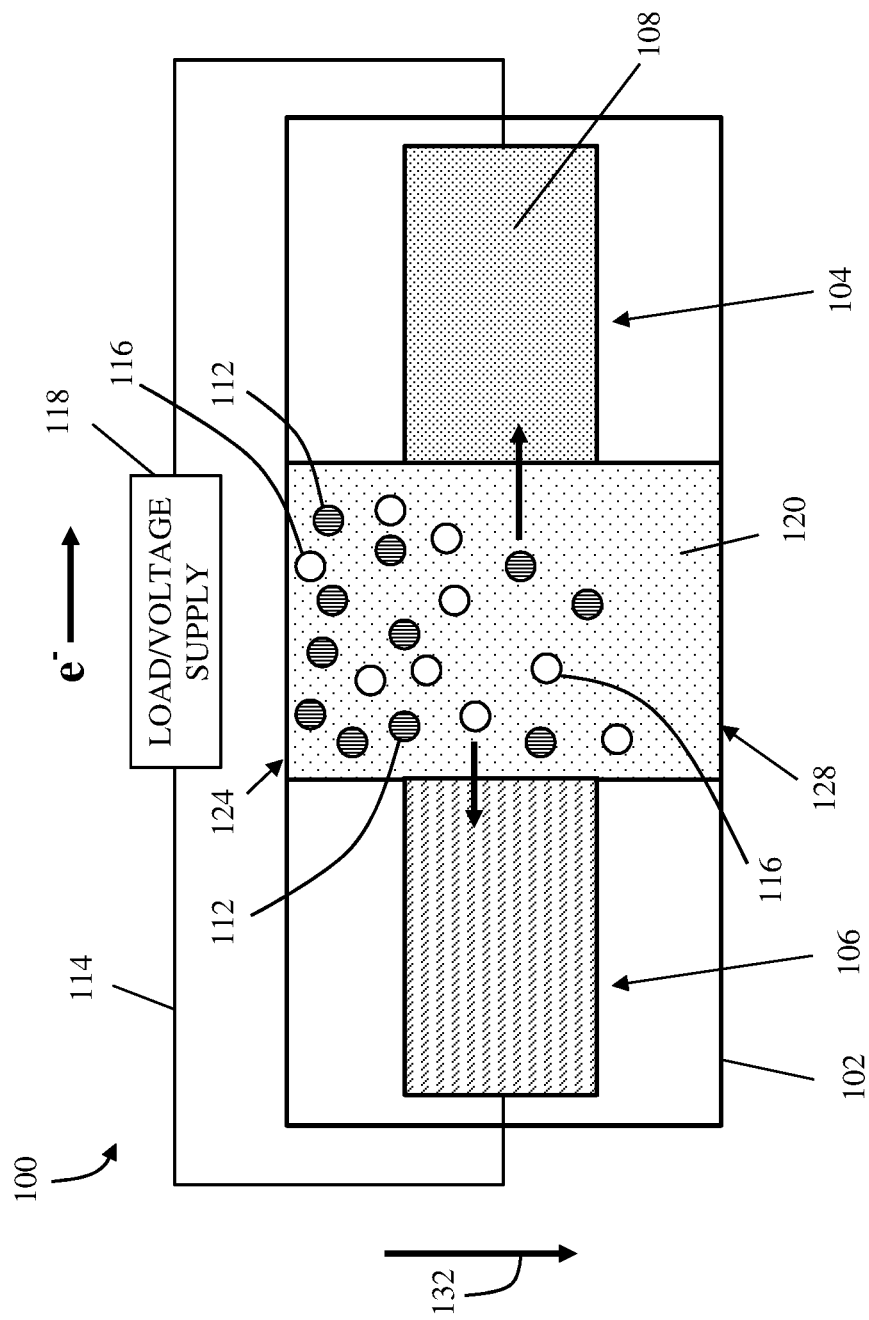
FIG. 1 depicts a simplified schematic of a device for removing chloride-containing salts from water according to one embodiment, the device shown in a first operating state in which a voltage applied to an electrode of the device causes a conversion material to reversibly add first target anions from a water solution via a conversion reaction.

For the purpose of promoting an understanding of the principles of the disclosure, reference will now be made to the embodiments illustrated in the drawings and described in the following written specification. It is understood that no limitation to the scope of the disclosure is thereby intended. It is further understood that the disclosure includes any alterations and modifications to the illustrated embodiments and includes further applications of the principles of the disclosure as would normally occur to one skilled in the art to which this disclosure pertains.

Figure 2:
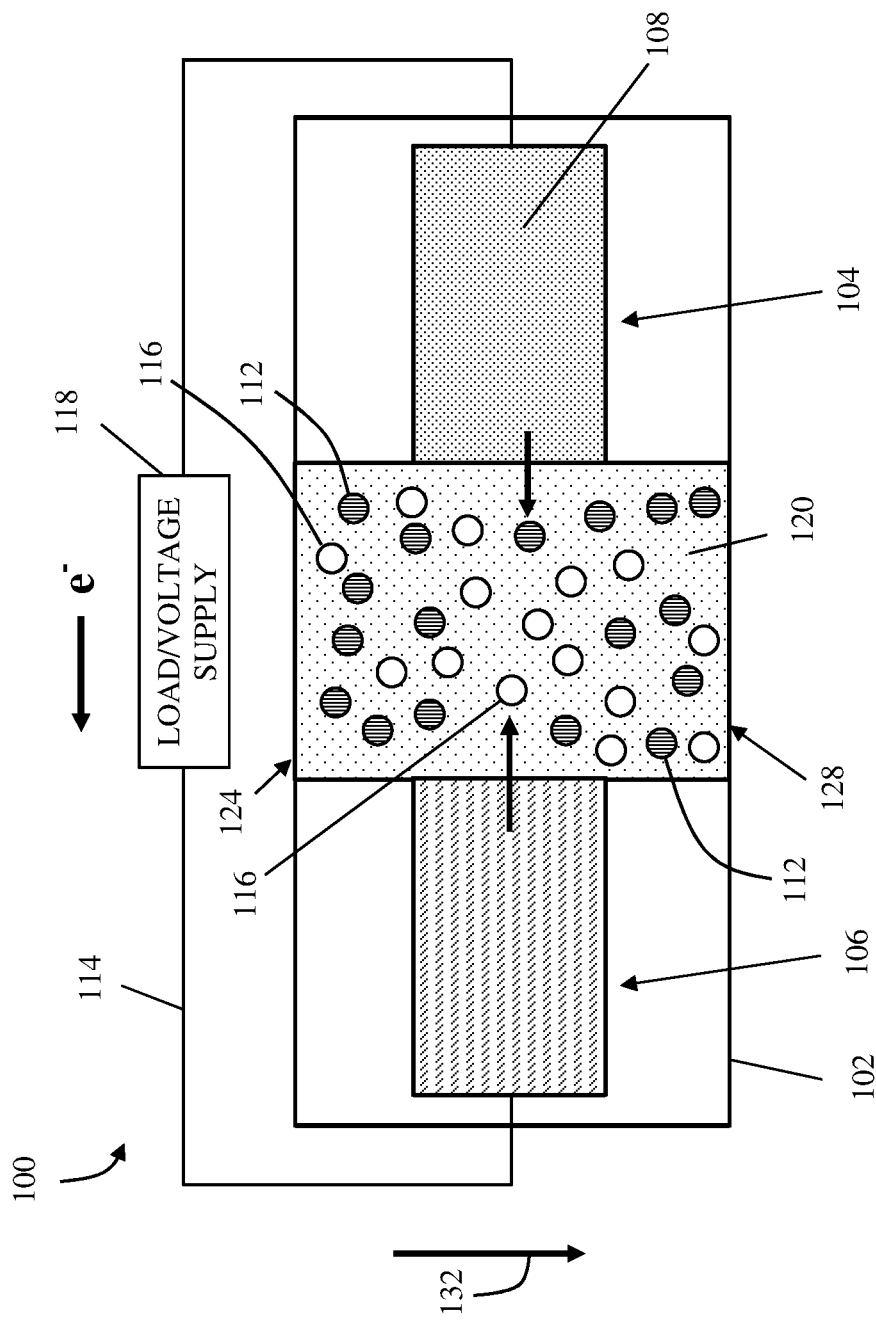
FIG. 2 depicts the device of FIG. 1 in a second operating state in which the electrode is induced to reversibly dissociate the first target anions from the conversion material into the water solution via the conversion reaction.

FIGS. 1 and 2 illustrate a device 100 configured to remove ions from a water supply. The device 100 includes a first electrode 104 with a conversion material 108 configured to reversibly store first target ions 112 in different operating states of the device via a reversible conversion reaction. The first target ions 112 in the illustrated embodiment are chloride anions Cl⁻ though in other embodiments the first target ions 112 can be other target ions. The device 100 can be understood to perform a water dechlorination process when the first target ions 112 are chloride anions $Cl^-$. As used herein, the phrases "dechlorination process(es)," "dechlorination cycle(s)," and the like, particularly when used in connection with the terms "water," "water solution," and the like, refer broadly to the removal of chloride-containing salts from water and are not limited only to the removal of HOCl. As used herein, the phrases "dechlorinated compound(s)," "dechlorinated material(s)," "dechlorinated version(s)," and the like refer to a composition of material that contains no chlorine or contains less chlorine than another composition to which the composition is compared with regard to chlorine content.

The device 100 shown in FIGS. 1 and 2 also includes a second electrode 106 electrically connected to the first electrode 104 via an external circuit 114. The second electrode 106 in some embodiments includes an active material configured to reversibly store second target ions 116 in the different operating states of the device 100. In one embodiment, the second target ions 116 are the cation $Na^+$ though in other embodiments the second target ions 116 can be other target ions. The device 100 further contains a power source, current source, or voltage source 118 configured to supply electric current to the first and second electrodes 104, 106. The electric current can be constant current. The electric current is applied to remove the target ions from the water supply.

The conversion material 108 disclosed herein was identified using a materials database known as The Materials Project, which lists crystal structures and density-functional-theory (DFT) energies for materials. The materials database was used to compute the stability and voltage for chlorine-conversion materials. The materials were sought for conversion-type reactions, where two stable compounds exist, X and XCl, and the chlorine can be reversibly extracted from the chlorinated compound. The convex-hull energy gives the stability of the material, or the energy gained if the material decomposes into other compounds. For example, the compound AgCl has a convex-hull energy of 0, which means that it would gain no energy to turn into another compound. However, the compound $ZnO_2$ in the (Pa-3) phase has a convex-hull energy of 0.143 eV/atom, which means that it would gain 0.143 eV/atom to decompose into ZnO ($P6_3mc$) and $O_2$ gas.

The half-cell potential is computed using the following half-cell reaction:

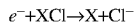

$$e^- + XCl \rightarrow X + Cl^-$$

The energy relative to the standard hydrogen electrode (SHE) is found with the knowledge that chlorine gas reduction happens at 1.36 V relative to the SHE, or equivalently:

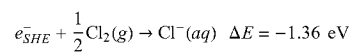

$$e^-_{SHE} + \frac{1}{2}Cl_2(g) \rightarrow Cl^-(aq) \quad \Delta E = -1.36 \text{ eV}$$

The energies of XCl and X are given by the DFT energies of formation for each. The energies of formation of $Cl_2$ gas is zero by definition. All calculations are performed in the dilute limit.

For this reaction to occur, the system must overcome the energy barrier between the initial and final states. This energy barrier loosely corresponds to the overpotential or bias necessary for the reaction to occur, but is more difficult to calculate because the transition state(s) must be known and their energies computed. The compatibility between two crystal structures is approximated by using the space group. If the removal of Cl retains the symmetries of the space group, or increases the symmetries of the space group, the two structures are likely compatible in a reversible reaction.

Otherwise, they are likely incompatible, as the reaction likely involves significant diffusion within the host lattice (high energy barrier), instead of a purely martensitic transformation in the host lattice (lower energy barrier).

The conversion material 108 disclosed herein includes materials that (1) contain no toxic or expensive elements; (2) are stable compounds; (3) are stable in water, (4) have a low overpotential (voltage hysteresis) for the chlorination and dechlorination processes; and (5) are processable. The requirements of (1) limit the materials to certain elements. The requirements of (2) limit the materials to those with a maximum convex-hull energy of approximately zero. However, materials with a convex-hull energy slightly larger than zero can be sufficient due to discrepancies in the materials database, effects of temperature, and hysteresis. The requirements of (3) limit half-cell potentials of the materials to within a particular range relative to the SHE. Although water is stable between −0.8 to 1.23 V (depending on pH), the selection of the second electrode 106 will affect the voltage reversal of the first electrode 104 with the conversion material 108, so the electrochemical window is taken to be larger. Additionally, assumptions in the calculations motivate a slightly larger electrochemical window. The requirements of (4) are approximated by symmetric considerations given above. Additionally, the crystal structures of the materials are examined afterwards.

In view of the above parameters, the conversion material 108 is limited to materials that (1) contain one or more of aluminum (Al), calcium (Ca), chlorine (Cl), copper (Cu), iron (Fe), hydrogen (H), potassium (K), magnesium (Mg), manganese (Mn), sodium (Na), nickel (Ni), phosphorus (P), silicon (Si), tin (Sn), zinc (Zn), and oxygen (O); (2) have the same amount of each element (except for Cl) between the chlorinated and dechlorinated compounds; (3) are stable within 0.1 eV from the convex hull; (4) have crystal structure similarity such that the space group of the chlorinated material is the same space group or a subgroup thereof as the dechlorinated material; (5) have a voltage bias between −0.5 to 1.5 V relative to the standard hydrogen electrode; (6) both the chlorinated and dechlorinated versions are in the materials database; and (7) are not readily known to be soluble in water (>1 g/100 mL).

The conversion material 108 disclosed herein is at least one of the following materials.

Copper-Based Materials $Al_2CuCl_8+8e^- \rightarrow Al_2Cu+8\ Cl^-$ (Material 1) is predicted at approximately −0.87 V RHE.
$AlCuCl_4+4e^- \rightarrow AlCu+4\ Cl^-$ (Material 2) is predicted at approximately −0.9 V RHE.
$CuCl_x+y\ e^- \rightarrow CuCl_{x-y}+y\ Cl^-$ (Material 3) is predicted at approximately 0.02-0.09 V RHE (for x=1, y=1, depending on phase of copper) and 0.9-1.0 V RHE (for x=4, y=3) and 0.7-0.8 V RHE (for x=4, y=4).
$Cu_2OCl_2+2\ e^- \rightarrow Cu_2O+2\ Cl^-$ (Material 4) is predicted at approximately 0.1 V RHE.

Since copper can be toxic depending on its concentration, care must be taken to ensure that the copper ions do not dissolve in excess of regulations. For instance, the legal level of copper ions in the United Kingdom water supply is 2.0 mg/L (see UK Water Supply Regulations 2000. Schedule 1, available at http://www.legislation.gov.uk/uksi/2000/3184/schedule/1/made). For a device treating 10 L per day (e.g. 2 L/person for 5 people), this requirement corresponds to a mass loss of approximately 600 mg per month.

Iron-Based Materials $KFeCl_4+e^- \rightarrow KFeCl_3+Cl^-$ (Material 5) is predicted at approximately −0.4--0.6 V RHE.
$FeOCl+e^- \rightarrow FeO+Cl^-$ (Material 6) is predicted at approximately −0.2 V RHE (depending on FeO crystal structure).

The second electrode 106 can be any electrode material, especially electrode materials configured as an intercalation host for sodium. A non-limiting example of an intercalation host material for sodium includes $Na_{0.44}Mn_2O_4$, $NaMnO_2$, $Na_{2/3}Ni_{1/4}Mn_{3/4}O_2$, $Na_3V_2(PO_4)_3$, $Na_2VTi(PO_4)_3$, $NaVPO_4F$, $Na_2V_6O_{10} \cdot xH_2O$, $Na_{0.66}[Mn_{0.66}Ti_{0.34}]O_2$, $Na_2FeP_2O_7$, $Na_3TiMn(PO_4)_3$, and $Na_3V_2O_2(PO_4)_2F$.

The first electrode 104 can include the conversion material 108 of any one of Materials 1-6 as well as additives for stability, conductivity, and/or other physical properties. The second electrode 106 can also include additives for stability, conductivity, and/or other physical properties in addition to the active material. The electrode(s) can include active material in the amount of about 70 to 99 wt. %, 75 to 97 wt. %, or 60 to 95 wt. %, based on the total weight of the electrode. The electrode(s) can include one or more conductivity agents in the amount of about 1 to 40 wt. %, 2.5 to 30 wt. %, or 5 to 20 wt. %, based on the total weight of the electrode. The electrode(s) can include one or more polymeric binders in the amount of about 1 to 30 wt. %, 2.5 to 20 wt. %, or 5 to 15 wt. %.

A non-limiting example of a conductivity agent can include carbon black, conductive carbon black, amorphous carbon, carbon fibers, quaternary ammonium salt(s), alkyl sulfonate(s), halogen-free cationic compound(s), the like, or a combination thereof.

A non-limiting example of a polymeric binder can be polyvinylidene fluoride (PVdF), polyacrylonitrile (PAN), poly(methyl methacrylate) (PMMA), polyethylene glycol (PEO), polyimide, polydopamine, poly(ethylene glycol) diacrylate, polymethylpentene, nylon, metal-aramid, polyether imide, copolyester, polyetherketone, carboxymethyl cellulose, styrene-butadiene rubber (SBR), copolymers and blends such as poly(vinylidenefluoride-hexafluoropropylene) (PVdF-HFP), poly(vinylidenefluoride-chlrotrifluoroethylene) (PVdF-CTFE), poly(methyl methacrylate-vinyl acetate) (PMMA-VAc), poly(cthylene glycol) diacrylate (PEGDA), poly(methyl methacrylate-acrylonitrile-vinyl acetate) (PMMA-AN-VAc), poly(methyl methacrylate-co-butyl acrylate) (PMMA-co-BA), poly(3,4-ethylenedioxythiophene) polystyrene sulfonate-co-polyethylene glycol (PEDOT-co-PEG), the like, or a combination thereof.

With continued reference to FIGS. 1 and 2, the device 100 in some embodiments is arranged in a water supply system (not shown) that includes various pumps, conduits, valves, and related components to transport water from a source to an end user. In the embodiment shown, the water source is a brackish water source. The device 100 in one embodiment includes a container 102 arranged in the water supply system such that a water solution 120 enters the container 102 at an input side 124 and exits the container 102 at an output side 128.

The container 102 can be a container, compartment, housing, vessel, can, canister, tank, or the like of any shape, size, or configuration capable of obtaining, retaining, holding, and/or releasing a liquid solution such as saline water, brackish water, sea water, ocean water, fresh water, sweet water, drinking water, desalinated water, contaminated water, industrial water, etc. The container is spacious enough to house a sufficient amount of a water solution undergoing water treatment; dimensions thus differ based on a specific application. The container can be large enough to serve industrial applications. The container can be made from different materials capable of withstanding corrosion, temperature fluctuations, changing pH, varying pressure, and be resistant to other chemical, mechanical, and/or physical conditions.

The container can be made from glass, plastic, composite, metal, ceramic, or a combination of materials. The container may feature one or more protective coatings. The container may be made from a material which minimizes occurrence of water contamination. The container may be made from material(s) which are nontoxic and comply with drinking water standards.

As the water solution 120 moves in a flow direction 132 through the device 100 and over at least a portion of the first electrode 104, the device 100 is configured to have different operating states so as to enable it to reversibly store the first target ions 112. The flow direction 132 shown in FIGS. 1 and 2 is for reference only and can be reversed in other embodiments. If the flow direction is reversed, the locations of the input side 124 and the output side 128 of the device will be reversed as well.

FIG. 1 illustrates the device 100 in a first operating state in which a voltage is applied to the first electrode 104 while the water solution 120 flows through the device 100 in the flow direction 132. The water solution 120 that enters the input side 124 of the container 102 is a saline water solution having a first concentration $c_1$ of the first target ions 112 (i.e., chloride ions). In the first operating state, the first target ions 112 in the saline water solution 120 are reversibly added to the conversion material 108 of the first electrode 104 via the voltage-induced conversion reaction: $X+Cl^- \rightarrow XCl+e^-$. During this reaction, the first target ions 112 chemically bond to the conversion material 108 such that the first target ions 112 are removed from the saline water solution 120. The water solution 120 that exits the output side 128 of the device 100 when the device is operated in the first operating state has a second concentration $c_2$ of the first target ions 112 that is lower than the first concentration $c_1$ that enters the input side 124 of the device 100. In the embodiment in which the first target ions 112 are the anion $Cl^-$, the water solution 120 exiting the device 110 will be a treated water solution. The voltage applied to the first electrode 104 in the first operating state is configured to be within −0.5 to 1.5 V, which closely approximates the stability window of water (i.e., −0.8 to +1.23 V vs. SHE), so as to avoid water electrolysis. The first operating state of the device 100 is sometimes referred to as a "purification cycle" since the removal of the first target ions 112 purifies the water stream exiting the device 100.

The second electrode 106 in some embodiments is configured to remove the second target ions 116 via intercalation, adsorption, or similar means during the purification cycle. In these embodiments, the water solution 120 that exits the output side 128 of the device 100 when the device is operated in the first operating state has a fourth concentration $c_4$ of the second target ions 116 that is lower than a fifth concentration $c_5$ of the second target ions 116 that enters the input side 124 of the device 100. In the embodiment in which the second target ions 116 are the cation $Na^+$, the water solution 120 exiting the device 100 will be a desalinated water solution. The voltage applied to the first and second electrodes 104, 106 in the first operating state is configured to be within −0.5 to 1.5 V, which closely approximates the stability window of water (i.e., −0.8 to +1.23 V vs. SHE), so as to avoid water electrolysis.

FIG. 2 illustrates the device 100 in a second operating state in which the voltage is no longer applied to the first electrode 104 and the first electrode 104 is electrically connected to a load. In the second operating state, the first electrode 104 releases the first target ions 112 (i.e., chloride ions) bonded to the conversion material 108 via the electrochemically-induced reaction: $XCl+e^- \rightarrow X+Cl^-$. During this reaction, the first target ions 112 dissociate from the conversion material 108 and are added to the water solution 120. The second operating state of the device 100 cleans or refreshes the first electrode 104 for a subsequent dechlorination cycle. The second operating state is sometimes referred to as a "wastewater cycle" since it adds the first target ions 112 back into the water stream exiting the device 100 to generate a wastewater solution having a third concentration $c_3$ of the first target ions 112 that is greater than the first concentration $c_1$.

In embodiments in which the second electrode 106 is configured to remove the second target ions 116, the water solution 120 that exits the output side 128 of the device 100 when the device is operated in the second operating state has a sixth concentration $c_6$ of the second target ions 116 that is higher than a fifth concentration $c_5$ of the second target ions 116 that enters the input side 124 of the device 100. In the embodiment in which the second target ions 116 are the cation $Na^+$, the water solution 120 exiting the device 100 will be a brine solution that has high concentrations of both $Na^+$ and $Cl^-$.

In view of the half-cell reactions disclosed herein for each of Materials 1-6, it will be appreciated that the amount of chlorine reversibly added to the conversion material 108 varies over a range during operation of the device 100 in the different operating states. As an example using Material 1, the amount of chlorine per formula unit in the conversion material 108 varies as represented by the formula $Al_2CuCl_{8-x}$, where $0 \leq x \leq 8$, such that the conversion material 108 can exist over a range of compositions between $Al_2CuCl_8$ (i.e. a compound with 8 chlorine per formula unit) and $Al_2Cu$ (i.e., a compound with 0 chlorine per formula unit). In this example, Material 1 has a lesser amount of chlorine or no chlorine at the start of the purification cycle compared to the amount of chlorine at the end of the purification cycles such that the conversion material 108 has a larger capacity to add chloride ions from the saline water solution 120. Conversely, Material 1 has a greater amount of chlorine at the start of the wastewater cycle compared to the amount of chlorine at the end of the wastewater cycle such that the conversion material 108 more readily dissociates chloride ions therefrom into the water solution 120.

In one embodiment, the first electrode 104 is cycled so as to avoid the conversion material 108 converting all the way to the limits of the range of chlorination indicated by the reactions of Materials 1-6 disclosed above. As an example using Material 1, the first electrode 104 is operated in the first operating state such that the conversion material 108 converts from $Al_2CuCl_2$ (i.e., a compound with 2 chlorine per formula unit) at the start of the purification cycle to $Al_2CuCl_6$ (i.e., a compound with 6 chlorine per formula unit) at the end of the purification cycle. The first electrode 104 is then operated in the second operating state such that the conversion material 108 converts from $Al_2CuCl_6$ (i.e., a compound with 6 chlorine per formula unit) at the start of the wastewater cycle to $Al_2CuCl_2$ (i.e., a compound with 2 chlorine per formula unit) at the end of the wastewater cycle. The cycling of the first electrode 104 between the first and second operating states in this example converts the conversion material 108 over a narrower range of compositions than indicated by the reactions disclosed herein for each of Materials 1-6 so as to improve the stability of the voltages for the different conversion materials.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. A device for removing chloride-containing salts from water, comprising:
    a container configured to contain a saline water solution having a first concentration $c_1$ of chloride ions;
    a first electrode arranged in fluid communication with the saline water solution, the first electrode including a conversion material that is insoluble in the saline water solution, the conversion material having a composition that includes at least two or more of aluminum, chlorine, copper, iron, oxygen, and potassium, the composition variable over a range with respect to a quantity of chloride ions per formula unit; and
    a power source configured to supply current to the first electrode so as to induce a reversible conversion reaction in which the conversion material (i) associates with the chloride ions in the saline water solution in a first operating state to generate a treated water solution having a second concentration $c_2$ of the chloride ions and (ii) dissociates the chloride ions therefrom into the saline water solution in a second operating state to generate a wastewater solution having a third concentration $c_3$ of the chloride ions where $c_3 > c_1 > c_2$, wherein the conversion material is represented by the formula $Al_2CuCl_x$, where $0 \leq x \leq 8$.

2. The device of claim 1, wherein the quantity of chloride ions per formula unit in the conversion material is variable over a first range between a first quantity and a second quantity that is greater than the first quantity.

3. The device of claim 2, wherein the first electrode is configured to be cycled repeatedly between the first and second operating states such that the quantity of chloride ions per formula unit is variable over a second range that is narrower than and within the first range.

4. The device of claim 1, further comprising a second electrode arranged in fluid communication with the saline water solution, the power source configured to supply current to the first and second electrodes at least in the first operating state such that a voltage of the first electrode is modulated within a range of −0.5 V to 1.5 V relative to a standard hydrogen electrode.

5. The device of claim 1, wherein a quantity of any one or more of the aluminum, copper, iron, oxygen, and potassium in the conversion material does not vary in the first and second operating states.

6. A device for removing chloride-containing salts from water, comprising:
    a container configured to contain a saline water solution having a first concentration $c_1$ of chloride ions;
    a first electrode arranged in fluid communication with the saline water solution, the first electrode including a conversion material that is insoluble in the saline water solution, the conversion material having a composition that includes at least two or more of aluminum, chlorine, copper, iron, oxygen, and potassium, the composition variable over a range with respect to a quantity of chloride ions per formula unit; and
    a power source configured to supply current to the first electrode so as to induce a reversible conversion reaction in which the conversion material (i) associates with the chloride ions in the saline water solution in a first operating state to generate a treated water solution having a second concentration $c_2$ of the chloride ions and (ii) dissociates the chloride ions therefrom into the saline water solution in a second operating state to generate a wastewater solution having a third concentration $c_3$ of the chloride ions where $c_3 > c_1 > c_2$, wherein the conversion material is represented by the formula $AlCuCl_x$, where $0 \leq x \leq 4$.

7. The device of claim 6 wherein the quantity of chloride ions per formula unit in the conversion material is variable over a first range between a first quantity and a second quantity that is greater than the first quantity.

8. The device of claim 7, wherein the first electrode is configured to be cycled repeatedly between the first and second operating states such that the quantity of chloride ions per formula unit is variable over a second range that is narrower than and within the first range.

9. The device of claim 6, further comprising a second electrode arranged in fluid communication with the saline water solution, the power source configured to supply current to the first and second electrodes at least in the first operating state such that a voltage of the first electrode is modulated within a range of −0.5 V to 1.5 V relative to a standard hydrogen electrode.

10. The device of claim 6, wherein a quantity of any one or more of the aluminum, copper, iron, oxygen, and potassium in the conversion material does not vary in the first and second operating states.

11. A device for removing chloride-containing salts from water, comprising:
    a container configured to contain a saline water solution having a first concentration $c_1$ of chloride ions;
    a first electrode arranged in fluid communication with the saline water solution, the first electrode including a conversion material that is insoluble in the saline water solution, the conversion material having a composition that includes at least two or more of aluminum, chlorine, copper, iron, oxygen, and potassium, the composition variable over a range with respect to a quantity of chloride ions per formula unit; and
    a power source configured to supply current to the first electrode so as to induce a reversible conversion reaction in which the conversion material (i) associates with the chloride ions in the saline water solution in a first operating state to generate a treated water solution having a second concentration $c_2$ of the chloride ions and (ii) dissociates the chloride ions therefrom into the saline water solution in a second operating state to generate a wastewater solution having a third concentration $c_3$ of the chloride ions where $c_3 > c_1 > c_2$, wherein the conversion material is represented by the formula $CuCl_x$, where $0 \leq x \leq 4$.

12. The device of claim 11 wherein the quantity of chloride ions per formula unit in the conversion material is variable over a first range between a first quantity and a second quantity that is greater than the first quantity.

13. The device of claim 12, wherein the first electrode is configured to be cycled repeatedly between the first and second operating states such that the quantity of chloride ions per formula unit is variable over a second range that is narrower than and within the first range.

14. The device of claim 11, further comprising a second electrode arranged in fluid communication with the saline water solution, the power source configured to supply current to the first and second electrodes at least in the first operating state such that a voltage of the first electrode is modulated within a range of −0.5 V to 1.5 V relative to a standard hydrogen electrode.

15. The device of claim 11, wherein a quantity of any one or more of the aluminum, copper, iron, oxygen, and potassium in the conversion material does not vary in the first and second operating states.

16. A device for removing chloride-containing salts from water, comprising:
   a container configured to contain a saline water solution having a first concentration $c_1$ of chloride ions;
   a first electrode arranged in fluid communication with the saline water solution, the first electrode including a conversion material that is insoluble in the saline water solution, the conversion material having a composition that includes at least two or more of aluminum, chlorine, copper, iron, oxygen, and potassium, the composition variable over a range with respect to a quantity of chloride ions per formula unit; and
   a power source configured to supply current to the first electrode so as to induce a reversible conversion reaction in which the conversion material (i) associates with the chloride ions in the saline water solution in a first operating state to generate a treated water solution having a second concentration $c_2$ of the chloride ions and (ii) dissociates the chloride ions therefrom into the saline water solution in a second operating state to generate a wastewater solution having a third concentration $c_3$ of the chloride ions where $c_3>c_1>c_2$, wherein the conversion material is represented by the formula $KFeCl_{4-x}$, where $0 \leq x \leq 1$.

17. The device of claim 16 wherein the quantity of chloride ions per formula unit in the conversion material is variable over a first range between a first quantity and a second quantity that is greater than the first quantity.

18. The device of claim 17, wherein the first electrode is configured to be cycled repeatedly between the first and second operating states such that the quantity of chloride ions per formula unit is variable over a second range that is narrower than and within the first range.

19. The device of claim 16, further comprising a second electrode arranged in fluid communication with the saline water solution, the power source configured to supply current to the first and second electrodes at least in the first operating state such that a voltage of the first electrode is modulated within a range of −0.5 V to 1.5 V relative to a standard hydrogen electrode.

20. The device of claim 16, wherein a quantity of any one or more of the aluminum, copper, iron, oxygen, and potassium in the conversion material does not vary in the first and second operating states.

* * * * *